Patented June 4, 1940

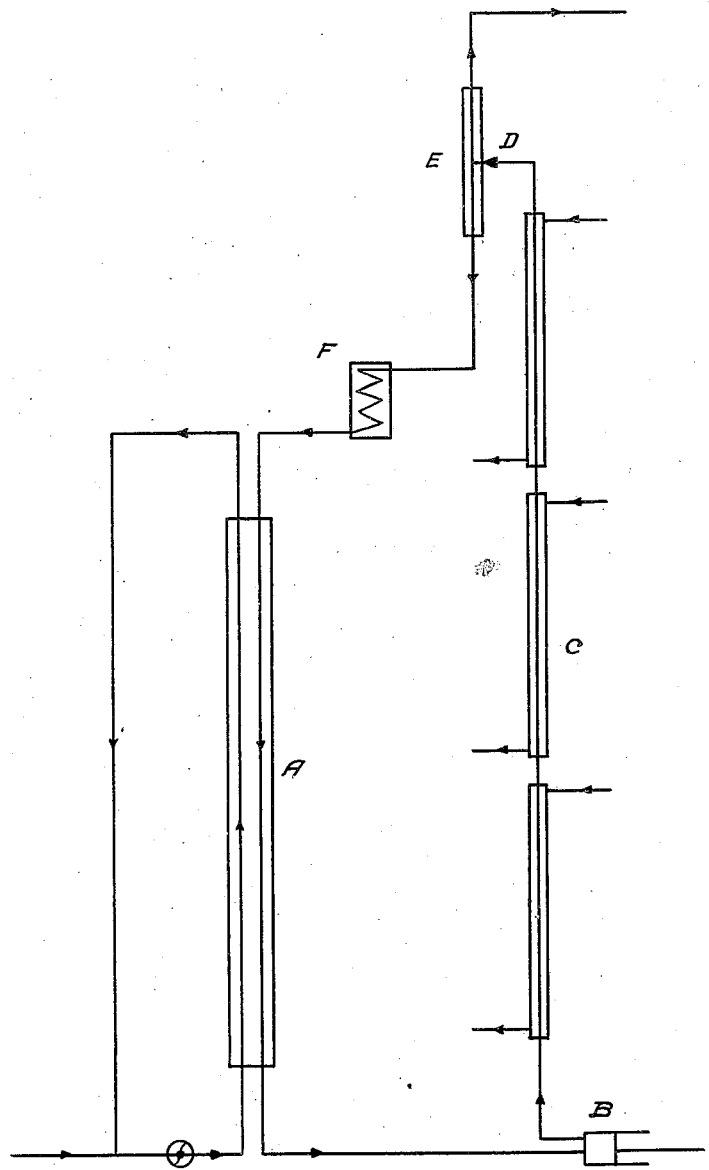

2,202,919

UNITED STATES PATENT OFFICE

2,202,919

PROCESS OF POLYMERIZING ACETYLENE

Albert Perlick, Pullach, near Munich, and Alfons Steinmetz, Frankfort - on - the - Main - Hochst, Germany, assignors to I. G. Farbenindustrie Aktiengesellschaft, Frankfort - on - the - Main, Germany Application August 4, 1939, Serial No. 288,332
In Germany March 11, 1938

5 Claims. (Cl. 260—678)

This invention relates to a process of polymerizing acetylene. More particularly, it relates to a process for the production of non-benzenoid polymers of acetylene.

It is known that acetylene polymerizes to non-benzenoid polymers thereof in the presence of a suitable catalyst. The catalyst usually contains a cuprous salt and frequently comprises additional salts, for example, a mixture of cuprous chloride and ammonium chloride is a well-known acetylene polymerization catalyst. In the usual prior art process, gaseous acetylene is cycled through hot aqueous ammonium chloride-cuprous chloride catalyst in aqueous solution, the reaction products being swept out of the reaction zone by the unreacted acetylene. The prior art processes are characterized by a low production per cycle because of the low solubility of acetylene at reaction temperatures. The solubility of acetylene can be increased by increase in pressure, but this is not used in prior art processes because such pressure is likely to result in decomposition of acetylene with explosive violence.

It is an object of this invention to discover an improved process for the non-benzenoid polymerization of acetylene. A further object is to discover an acetylene polymerization process giving an improved production of non-benzenoid acetylene polymers, particularly monovinylacetylene. Further objects will appear hereinafter. These objects have been accomplished by dissolving acetylene in a supporting liquid at moderate temperature and pressure, and polymerizing the acetylene in the presence of an acetylene polymerization catalyst by increasing the temperature to reaction temperature while maintaining the pressure above the saturation pressure at the increased temperature, and after reaction, releasing the pressure whereby the dissolved acetylene and its polymers are released in a gaseous state.

The single figure of the drawing is a diagrammatic sketch of the process.

In order that the invention may be more fully understood, a specific embodiment will now be set forth, it being understood, however, that the invention is not limited to said embodiment, but that suitable variations may be made as is more fully set forth hereinafter.

As shown in the drawing, an aqueous ammonium chloride-cuprous chloride solution is passed into spray tower or absorber A, and acetylene is likewise passed into said absorber which is maintained at a temperature of about 20° C. and a pressure of about 1.3 atmospheres. The aqueous catalyst solution substantially saturated with acetylene is forced with pump B through reaction tube C. In C, the solution is heated to about 85° C. and the pressure of the solution rises to about 10 atmospheres. This pressure is maintained by the action of pump B, and, hence, the acetylene remains in solution. After passing through the reaction tube C, the solution passes through nozzle D and then into separator E, the pressure being decreased to about 1 atmosphere. The non-benzenoid polymers of acetylene as well as unreacted acetylene leave the solution in a gaseous state as a result of this decrease in pressure. The catalyst solution flows back from vessel E, through condenser F, to absorber A where the cycle is renewed. The acetylene is separated from its polymers by any known method as, for example, that described in U. S. Patent 1,876,857 or that described in U. S. Patent 2,048,838, and the unreacted acetylene thus recovered may be recirculated to absorber A by a conventional conduit not shown in the drawing.

As a supporting liquid for the process, water or organic liquids may be used. The organic liquids suitable for the present invention are inert acetylene solvents such as liquid polyhydric alcohols, for example, glycol, diethylene glycol, glycerol and propylene glycol, etc., and aliphatic esters of polyhydric alcohols such as monoethylether of ethylene glycol, monobutyl ether of diethylene glycol, and diethylene glycol itself, etc. In general, it has been found that water is the most satisfactory supporting liquid, and, hence, it is preferred.

Any catalyst which promotes the non-benzenoid polymerization of acetylene may be used in the present process. Perhaps the best known and most commonly used catalyst is a mixture of cuprous chloride and ammonium chloride. This catalyst is preferred, but the invention is not limited thereto. As examples of other suitable catalyst, those disclosed in U. S. Patents 1,811,959, 1,926,055, 1,926,039, 1,926,056 and 2,048,838 are mentioned. It is not essential that the catalyst be completely soluble in the supporting liquid, although this is preferable. A slurry of undissolved catalyst is, however, in the scope of the present invention.

The supporting liquid is saturated with acetylene at as low a temperature as is convenient since decrease in temperature results in increase in solubility. The temperature at which saturation occurs must be below or close to the temperature of dissociation of the complex addition compounds formed between the catalyst and the acetylene at the operating pressure. The pressure at which saturation occurs is not critical. However, it is desirable to keep the pressure in a safe range. From 1 to 2½ atmospheres is preferred although the invention is not limited to such range.

After the catalyst has been saturated, the temperature is raised to a suitable reaction temperature which may be from 45–100° C. Preferably, the temperature should be about from 75–100° C., since increased temperature increased the rate of reaction. The selection of temperature depends upon the nature of equipment which is available or practicable because increase in temperature must be accompanied by increase in pressure, the pressure being maintained sufficiently high to exceed the saturation pressure at the reaction temperature. Thus, as is shown in the specific example above, when a reaction temperature of 85° C. is selected, the pressure must be maintained at least as high as 10 atmospheres. Where the temperature range is from 75–100° C. the pressure range is respectively above 8 and 15 atmospheres.

After reaction the pressure of the system is reduced while maintaining the higher temperature in order to remove the reaction products in the gaseous phase as completely as possible. In general, it has been found advisable to reduce the pressure to 1 atmosphere or less, but the invention is not limited thereto. Alternatively, the products may be caused to leave the solution in the gaseous state by the introduction of inert gas such, for example, as nitrogen or the inert gases of the zero group of the periodic table.

As is apparent from the detailed description above, the process may be operated as a continuous one by recycling the supporting liquid and catalyst and the unreacted acetylene may be recovered and recycled also. However, the inherent advantages of the present process are present in either batch or continuous reaction.

The advantages of the present invention are that a much higher production of acetylene polymers is obtained with a given catalyst and supporting liquid than has been possible by the processes of the prior art. This higher production is accomplished without substantially disturbing the relative yields of the various acetylene polymers. In prior art processes, it has been possible to increase polymerization of acetylene by various ways, but such increase has usually been accompanied by a decrease in yield of monovinylacetylene and a corresponding increase in yield of higher polymers such as divinylacetylene, hexadiene-yne, and octatriene-yne. Accordingly, the process of the present invention is an improved method of producing monovinylacetylene by the polymerization of acetylene. The process of the present invention is characterized further, in that, although the reaction occurs at high pressures, the danger of explosion is avoided because the acetylene is kept in solution. No prior art method has been able to accomplish this result.

While it is not desired to be limited to any theory, it is believed that when acetylene is dissolved in, for example, an aqueous catalyst solution, the acetylene is partly linked as an ionic complex with the catalyst and partly dissolved in water. It is thought that at lower pressures most of the acetylene is in the complex form and a comparatively small amount is in solution, whereas at higher pressures the percentage of complex is lower and the percentage of acetylene in solution is increased. Thus, at pressure of 10 atmospheres and a temperature of 85° C., this ratio is probably about 1:1. Almost the same relations are true of monovinylacetylene. It is further thought that acetylene first polymerizes to monovinylacetylene and that the monovinylacetylene then condenses with more acetylene to form the higher polymers. This reaction occurs primarily with the ionic complex which exists in the solution. By polymerization at high pressures according to the present invention, it is possible to increase the production of monovinylacetylene without decrease in its yield because a lower percentage of monovinylacetylene is in the ionic complex and a higher percentage is in solution and, hence, incapable of further polymerization.

We claim:

1. Process for the preparation of non-benzenoid polymers of acetylene which comprises dissolving acetylene in a supporting liquid at moderate temperature and pressure, polymerizing the acetylene in the presence of an acetylene polymerization catalyst by increasing the temperature to reaction temperature while maintaining the pressure greater than the saturation pressure at the increased temperature.

2. Process for the continuous preparation of non-benzenoid polymers of acetylene which comprises substantially saturating with acetylene a supporting liquid containing an acetylene polymerization catalyst at moderate temperature and pressure, polymerizing the acetylene by increasing the temperature to reaction temperature while maintaining the pressure above saturation pressure at the increased temperature, then lowering the pressure whereby unreacted acetylene and non-benzenoid acetylene polymers leave the supporting liquid in the gaseous state, separating the acetylene from its polymers and recirculating the recovered acetylene and the supporting liquid to the first stage of the process.

3. Process for the preparation of non-benzenoid polymers of acetylene which comprises dissolving an acetylene polymerization catalyst in water, substantially saturating the resulting solution with acetylene at moderate temperature and pressure, polymerizing the acetylene by raising the temperature to reaction temperature while maintaining the pressure above the saturation pressure at the increased temperature, and then lowering the pressure whereby unreacted acetylene and non-benzenoid polymers of acetylene leave the solution in a gaseous state.

4. Process for the preparation of non-benzenoid polymers of acetylene which comprises saturating with acetylene an aqueous ammonium chloride-cuprous chloride solution at about 15 to 35° C., at about 1 to 2.5 atmospheres of pressure, raising the pressure to at least 8 to 15 atmospheres, and raising the temperature to about 75 to 100° C., the pressure and temperature being raised proportionally to maintain the pressure above saturation pressure, after reaction lowering the pressure whereby the unreacted acetylene and its polymers leave the solution in a gaseous state.

5. Process for the preparation of non-benzenoid polymers of acetylene which comprises saturating with acetylene an aqueous ammonium chloride-cuprous chloride solution at about 20° C., at about 1.3 atmospheres of pressure, raising the pressure to at least 10 atmospheres, and raising the temperature to about 85° C., after reaction lowering the pressure to about 1 atmosphere whereby the unreacted acetylene and its polymers leave the solution in a gaseous state and separating the unreacted acetylene from its polymers.

ALBERT PERLICK.
ALFONS STEINMETZ.